(12) United States Patent
Yagnik et al.

(10) Patent No.: US 9,143,784 B2
(45) Date of Patent: Sep. 22, 2015

(54) TRANSFORMATION INVARIANT MEDIA MATCHING

(71) Applicant: Google Inc., Mountain View, CA (US)

(72) Inventors: Jay Yagnik, Mountain View, CA (US); Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 14/025,768

(22) Filed: Sep. 12, 2013

(65) Prior Publication Data

US 2014/0016706 A1    Jan. 16, 2014

Related U.S. Application Data

(62) Division of application No. 13/298,957, filed on Nov. 17, 2011, now Pat. No. 8,588,525.

(51) Int. Cl.
*G06K 9/00* (2006.01)
*H04N 19/60* (2014.01)

(52) U.S. Cl.
CPC ...... *H04N 19/00775* (2013.01); *G06K 9/00744* (2013.01); *H04N 19/60* (2014.11)

(58) Field of Classification Search
None
See application file for complete search history.

(56) References Cited

U.S. PATENT DOCUMENTS 5,956,434 A * 9/1999 Shibata et al. ............ 382/278
2002/0178410 A1 * 11/2002 Haitsma et al. ........... 714/709
2008/0212115 A1 * 9/2008 Konishi ..................... 358/1.9
2010/0124354 A1 * 5/2010 More ......................... 382/100
2010/0287201 A1 * 11/2010 Damstra et al. ............ 707/780

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

(Continued)

*Primary Examiner* — Bhavesh Mehta
*Assistant Examiner* — Feng Niu
(74) *Attorney, Agent, or Firm* — Amin, Turocy & Watson, LLP

(57) ABSTRACT

This disclosure relates to transformation invariant media matching. A fingerprinting component can generate a transformation invariant identifier for media content by adaptively encoding the relative ordering of signal markers in media content. The signal markers can be adaptively encoded via reference point geometry, or ratio histograms. An identification component compares the identifier against a set of identifiers for known media content, and the media content can be matched or identified as a function of the comparison.

20 Claims, 12 Drawing Sheets

(56) References Cited

OTHER PUBLICATIONS

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

Notice of Allowance for U.S. Appl. No. 13/298,957, dated Jun. 14, 2013, 28 pages.

Massoudi et al., "A video fingerprint based on visual digest and local fingerprints," IEEE Int. Conf. Image Proc. (ICIP), pp. 2297-2300, Oct. 2006.

Cano et al., "A review of audio fingerprinting", the Journal of VLSI Signal Processing, 41 (3):271-284, 2005.

Amsaleg et al., "A robust technique to recognize objects in images, and the DB problems it raises". Multimedia Information Systems (2001) 1-10.

Schmid et al., "Local grayvalue invariants for image retrieval". IEEE Transactions on Pattern Analysis and Machine Intelligence 19 (1997) 530-535.

Joly et al., "Robust content-based video copy identification in a large reference database," Int. Conf. on Image and Video Retrieval (CIVR), pp. 414-424, 2003.

Law-To et al., "Robust voting algorithms based on labels of behavior for video copy detection," Proc. ACM Int. Conf. on Multimedia, pp. 835-844, 2006.

Maani et al., "Local feature extraction for video copy detection in a database," IEEE Int. Conf. Image Proc. (ICIP), pp. 1716-1719, Oct. 2008.

Sarkar et al., "Video fingerprinting: features for duplicate and similar video detection and query-based video retrieval," Proc. SPIE, Multimedia Content Access: Algorithms and Systems, vol. 6820, Jan. 2008.

Chandrasekha et al., "Survey and evaluation of audio fingerprinting schemes for mobile query-by-example applications," in Proceedings of the 12th International Conference on Music Information Retrieval, pp. 801-806, Miami, Fla, USA, Oct. 2011.

Yagnik, J., et al., "The Power of Comparative Reasoning," Proceedings of the 2011 International Conference on Computer Vision (ICCV '11), Nov. 6, 2011, pp. 24312438, IEEE Computer Society, Washington, DC.

* cited by examiner

TRANSFORMATION INVARIANT MEDIA MATCHING

CROSS REFERENCE TO RELATED APPLICATIONS

This application is a divisional application of U.S. patent application Ser. No. 13/298,957 filed Nov. 17, 2011 and entitled "TRANSFORMATION INVARIANT MEDIA MATCHING". The entirety of which is incorporated herein by reference.

TECHNICAL FIELD

This disclosure generally relates to systems and methods that facilitate transformation invariant media matching.

BACKGROUND

Internet media sharing enables users to share media content virtually anywhere at any time, as long as they have access to a media capable device with an internet connection. The convenience of being able to view media content via the internet, essentially on demand, has resulted in explosive growth of internet media viewing. Internet media traffic is currently near a majority of consumer internet traffic, and the rate of demand is projected to continue increasing.

People have the ability to quickly identify or recognize known media content that has undergone a transformation, such as a popular song that has been slowed down, or when a person other than an original artist is covering a known song in a user created video or audio recording. However, transformations of media content such as temporal stretches, aspect ratio alterations, and so forth have proven difficult and computationally expensive for computer recognition systems.

Typically, conventional systems for media content matching extract features from the media content with fixed reference frames. The fixed reference frames cause the extracted features to be brittle when subjected to various transformations, such as time stretching. As a result, many conventional systems for media matching experience performance degradation when the media content is subject to transformations.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

According to an aspect of the subject innovation, systems and methods for transformation invariant media matching are disclosed. A fingerprinting component can generate a transformation invariant identifier for media content by adaptively encoding the relative ordering of signal markers in media content. The signal markers can be adaptively encoded via reference point geometry, or ratio histograms. An identification component compares the identifier against a set of identifiers for known media content, and the media content can be matched or identified as a function of the comparison.

In an embodiment, a media matching component includes a reference component that selects a reference point in a signal image, a detection component that determines a set of respective distances from the reference point to a set of other points at various levels in the signal image, and a hashing component that generates a hash value as a function of the set respective distances.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
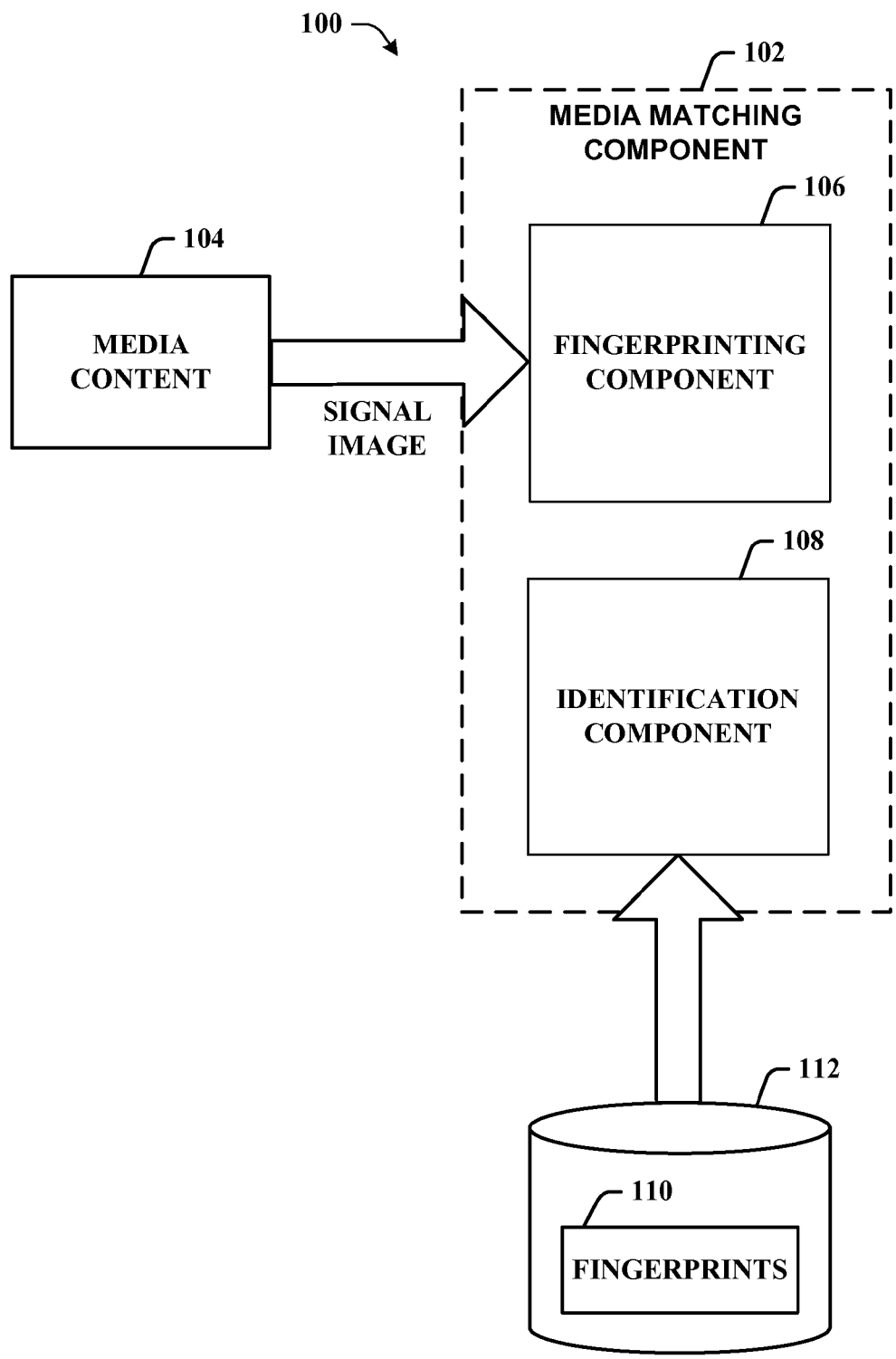
FIG. 1 illustrates an example system for transformation invariant media matching in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As noted in the Background section, techniques for media content matching that extract features from the media content with fixed reference frames often experience performance degradation when the media content is subject to transformations. The fixed reference frames cause the extracted features to be brittle when subjected to various transformations, such as time stretching. As a consequence, matching, using such techniques, media that has been subject to transformations can be difficult and computationally expensive.

One non-limiting implementation of the innovation provides efficient and accurate transformation invariant media matching. The implementation adaptively encodes the relative ordering of signal markers in the media content to generate identifiers for the media content that are transformation invariant. The identifiers are compared to identifiers of known media content for matching or identification.

More particularly, in accordance with an embodiment, a fingerprinting component determines a transformation invariant identifier for media content. The fingerprinting component adaptively encodes the relative ordering of signal markers in the media content using reference point geometry, or ratio histograms. An identification component compares the identifier against a set of identifiers for known media content, and the media content can be identified or matched as a function of the comparison.

Non-Limiting Examples of Filter Based Object Detection Using Hash Functions

Turning now to FIG. 1, illustrated is an example system 100 for transformation invariant media matching in accordance with various aspects described in this disclosure. Generally, system 100 can include a memory that stores computer executable components and a processor that executes computer executable components stored in the memory, examples of which can be found with reference to FIG. 12. System 100 includes a media matching component 102. The media matching component 102 recognizes, identifies, or otherwise determines the identity of media content 104 (e.g., media file, media data, etc.) by matching the media content 104, or a portion of the media content 104, with known media content, or a portion of known media content. The media content 104 can include audio data, video data, image data, photographic data, or graphical representations of data. For example, the media content 104 can include a song uploaded to a media hosting service by a user, and the media matching component 102 can determine the identity of the song by matching the media content 104 with a known song.

The media matching component 102 includes a fingerprinting component 106, and an identification component 108. The fingerprinting component 106 determines, provides, or otherwise generates a transformation invariant identifier (e.g., identifier or fingerprint) using signal markers (e.g., reference points) included in the media content 104. The fingerprinting component 106 obtains, acquires, or otherwise receives a signal image for the media content 104. For example, the media content 104 can be received by the media matching component 102, and the media matching component 102 can generate a signal image (e.g., waveform plot, spectrograms, Mel-frequency cepstral coefficients, etc.) for the media content 104. As an additional example, the media content 104 can include the signal image.

The identification component 108 compares the transformation invariant identifier (e.g., identifier, fingerprint, etc.) generated by the fingerprinting component 106 against a set of fingerprints (e.g., identifiers) 110 for known media content. The fingerprints 110 can be stored, saved, or otherwise maintained in a data store 112. In addition, the identification component 108 determines an identity of the media content 104 based at least in part on the comparison. For example, the identification component 108 can determine an identity of the media content 104 based on a comparison of the identifier to a fingerprint in the set of fingerprints, where the comparison satisfies a set of identification criterion, such as exceeding a predetermined identification matching threshold. Additionally or alternatively, the identification component 108 can employ the identifier to lookup a fingerprint in the set of fingerprints 110. For instance, in an exemplary implementation, the identifier is a hash value, and the identification component 108 employs the hash value to lookup a fingerprint in a hash table. It is to be appreciated that although the set of fingerprints 110 are illustrated as being maintained in the data store 112, such implementation is not so limited. For instance, the set of fingerprints 110 can be maintained in a disparate location, and the identification component 108 may access the set of fingerprints via a network connection.

Figure 2:
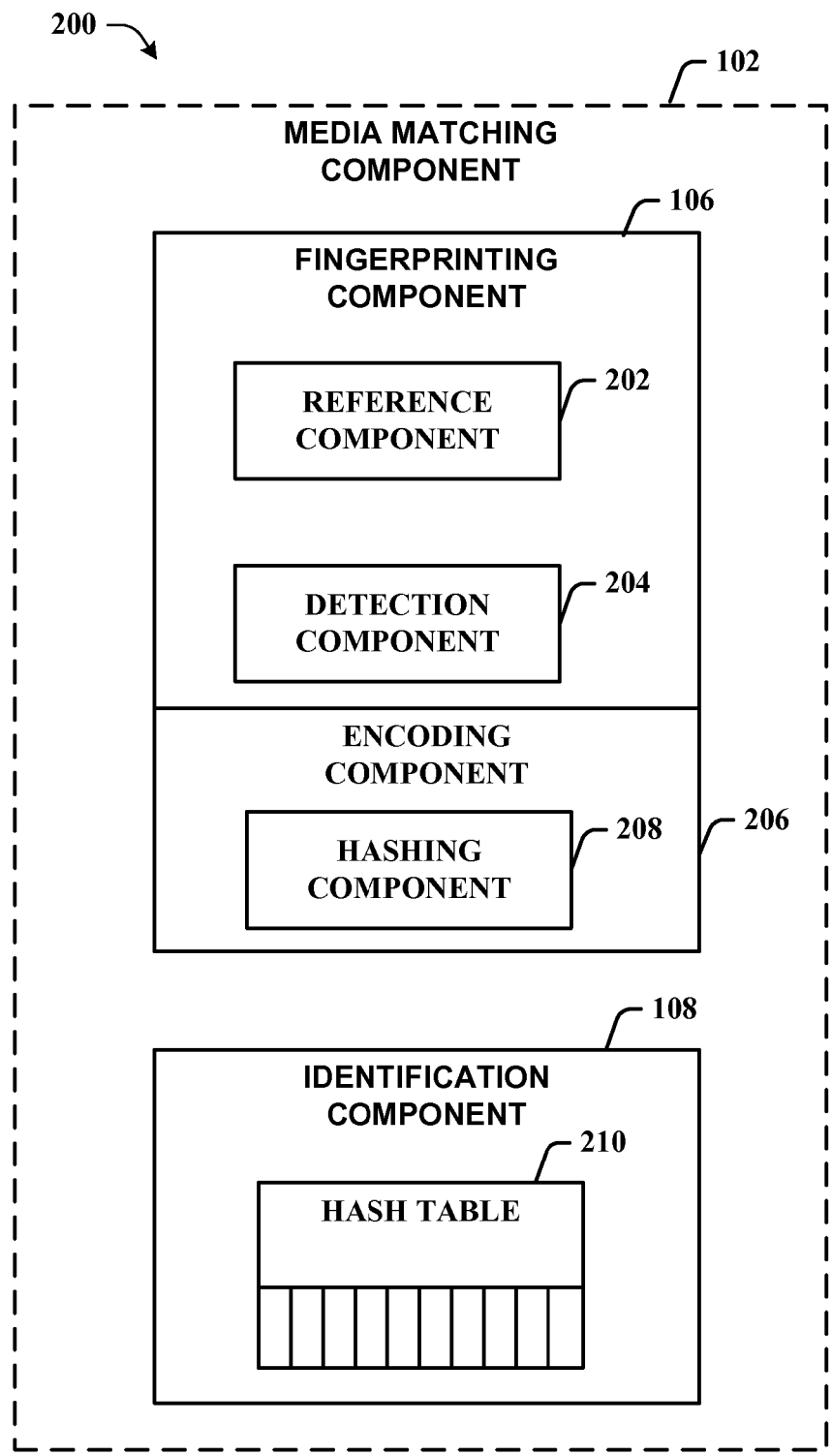
FIG. 2 illustrates an example system for transformation invariant media matching in accordance with various aspects described in this disclosure.

FIG. 2 illustrates an example system 200 for transformation invariant media matching in accordance with various aspects described in this disclosure. The system 200 includes a media matching component 102. As discussed, the media matching component 102 determines the identity of media content 104 by matching a media content 104, or a portion of the media content 104, with known media content, or a portion of known media content. The media matching component 102 in FIG. 2 includes a fingerprinting component 106 and an identification component 108. The fingerprinting component 106 generates an transformation invariant identifier (e.g., identifier, fingerprint, etc.) using signal markers included in media content 104, and the identification component 108 compares the identifier against a set of fingerprints (e.g., identifiers) 110 for known media content.

The fingerprinting component 106 in FIG. 2 includes a reference component 202, a detection component 204, and an encoding component 206. The reference component 202 determines a set of reference points (e.g., signal markers) in a signal image for the media content 104. The reference points can be selected based on a set of reference point selection criterion that can include virtually any criteria for selecting a reference point in the signal image, including but not limited to, a predetermined reference point location, or exceeding a predetermined response threshold when compared to a filter.

The detection component 204 measures, computes, or otherwise determines respective distances from reference points to other points (e.g., other reference points, edge points, intersection points, signal markers, etc.) in the signal image at various levels. In one non-limiting embodiment, the detection component 204 can transmit, send, or otherwise project a vector or ray from a first reference point at various levels, and determine the respective distances to closest points in the signal image that intersects (e.g., hits, collides with, etc.) the rays. It is to be appreciated that the signal image can have N-dimensions, where N is an integer. For example, the signal image can be a two-dimensional (e.g., 2D) image corresponding to spectral representations of the media content 104. The detection component 204 can dissect, segment, or otherwise slice multi-dimensional signal images in an appropriate direction when projecting the ray.

The encoding component 206 collects, accumulates, or otherwise combines the determined distances from the reference points to other points in the signal image (e.g., signal markers) into a set of respective vectors. The encoding component 206 can include a hashing component 208 that determines, calculates or otherwise computes a hash value as a function of the vectors (e.g., collected determined distances). The hashing component 208 can employ various hash functions to calculate the hash value, including, but not limited to, winner takes all (WTA) hashing, a locality sensitive hashing function, or hashing based on random projections. For example, the hashing component 208 can employ a WTA hash function to adaptively encode the relative ordering of the respective distances in the vectors (discussed in greater detail in connection with FIG. 3). It is to be appreciated that the particular hash algorithm (e.g., hash function) used can be a function of the media to be matched or identified.

The identification component 108 in FIG. 2 includes a hash table 210 of known media content. The identification component 108 compares the hash value generated by the hashing component 208 against the hash table 210 of known media content, and identifies the media content 104 based on the comparison. For example, if the hash value for the media content 104 matches a known song, then the identification component 108 can determine that the media content 104 corresponds to, or is a version of, the known song. It is to be appreciated that although the hash table 210 is illustrated as being included in the identification component 108, such implementation is not so limited. For instance, the hash table 210 can be maintained in a disparate location, wherein the identification component 108 accesses the hash table 210 via a network connection.

Figure 3:
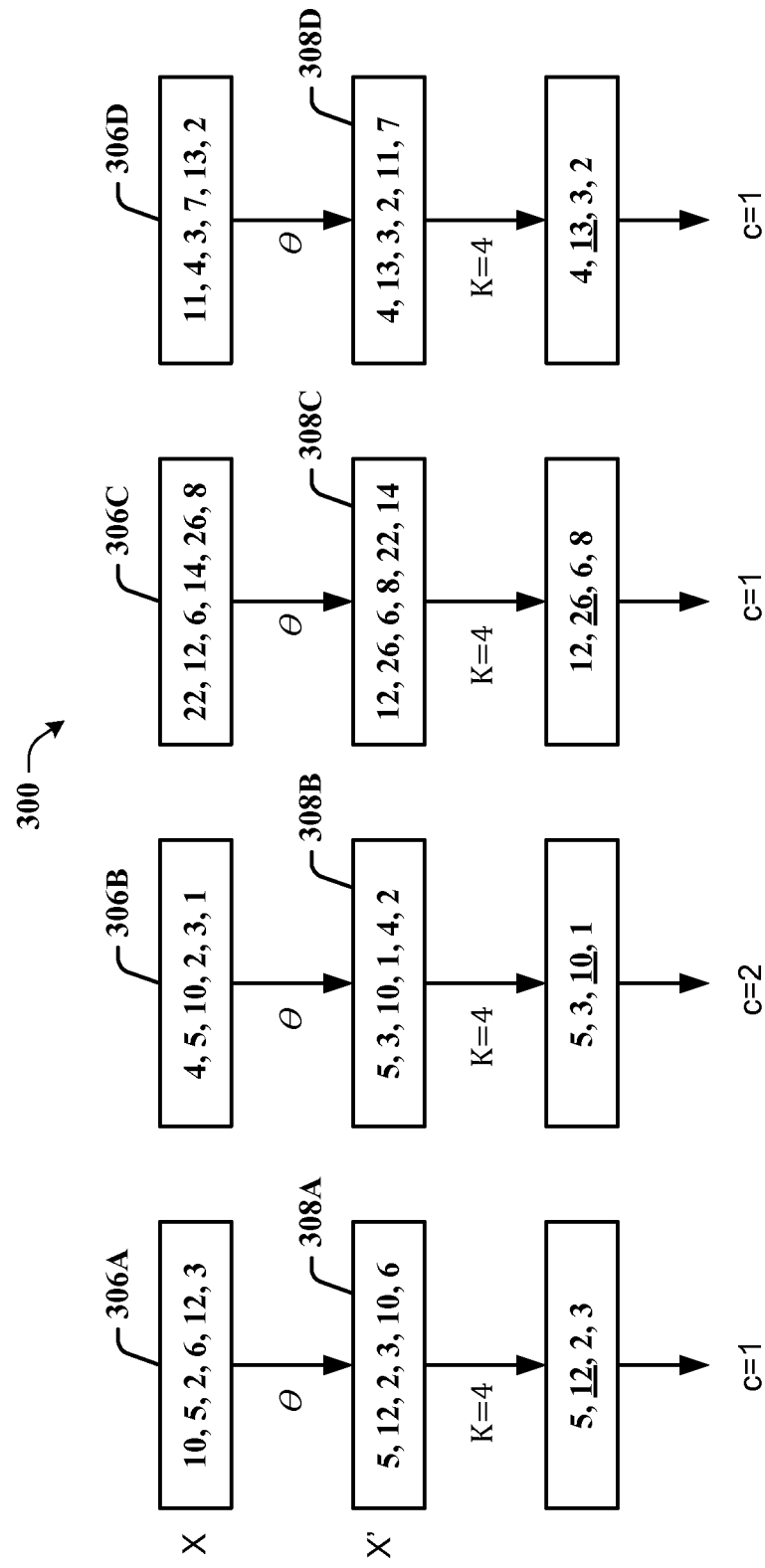
FIG. 3 illustrates an example winner takes all (WTA) hashing in accordance with various aspects described in this disclosure.

Referring to FIG. 3, illustrated is an example of winner takes all (WTA) hashing 300 in accordance with various aspects described in this disclosure. The hashing component 208 can employ a WTA hash function to transform a feature space into binary codes such that a Hamming distance in a resulting space correlates with rank similarity measures. Rank similarity measures provide stability to perturbations in numeric values, and provide good indications of inherent similarity, or agreement, between items being considered. A non-limiting example of a WTA hashing algorithm, as employed by the hashing component 208, is detailed by Algorithm 1, shown below:

---
(Algorithm 1)
WTA Hash

Input: A set of m Permutations $\Theta$, window size K, input vector X.
Output: Sparse vector of codes $C_X$.
   1. For each permutation $\theta_i$ in $\Theta$.
      (a) Permutate elements of X according to $\theta_i$ to get X'.
      (b) Initialize $i^{th}$ sparse code $c_{xi}$ to 0.
      (c) Set $c_{xi}$ to the index of maximum value in X'(1...K)
         i. For j =0 to K−1
            A. If X'(j) > X'($c_{xi}$) then $c_{xi}$ = j.
   2. $C_x = [c_{x0}, c_{x1}, ... , c_{xm-1}]$, C contains m codes, each taking a value between 0 and K −1.

---

Algorithm 1 provides a feature space transformation having a resulting space that is not sensitive to the absolute values of the feature dimensions, but rather on the implicit ordering defined by those values. In effect, the similarity between two points is defined by the degree to which their feature dimension rankings agree. A pair-wise order measure can be defined according to Equation 1 below:

$$PO(X, Y) = \sum_i \sum_{j<i} T((x_i - x_j)(y_i - y_j)) \qquad \text{(Equation 1)}$$

where $x_i$ and $y_i$ are the $i^{th}$ feature dimensions in X, Y∈R$^n$ and T is a threshold function, $$T(x) = \begin{cases} 1 & x > 0 \\ 0 & x \leq 0. \end{cases} \qquad \text{(Equation 1)}$$

Equation 1 measures the number of pairs of feature dimensions in X and Y that agree in ordering. By regrouping the pair-wise summations with respect to ranks, then the pair-wise order function PO can be rewritten in the following form:

$$PO(X, Y) = \sum_i R_i(X, Y) \qquad \text{(Equation 2)}$$

where $$R_i(X, Y) = |L(X, i) \cap L(Y, i)| \qquad \text{(Equation 3)}$$

$$L(X, i) = \{j \mid X(i) > X(j)\} \qquad \text{(Equation 4)}$$

Equation 2 groups pair-wise agreement terms by one of the indices in the pair. $R_i(X, Y)$, in Equation 3, measures the ranking agreement for index i with indices that rank below i. Indices of elements in X that are ranked below index I are denoted with L (X, i), in Equation 4. The rank agreement at index i is the cardinality of the intersection of the corresponding L sets from X and Y. For example, to compute PO(X, Y) between a first vector 306a and a second vector 306b in the WTA hash 300, the term $R_0(X, Y)$ will measure the size of the intersection for the set of indices smaller than index 0. L(X, 0)=[1, 2, 3, 5] are the set of indices in the first vector 306a that have values smaller than that at index 0, similarly for Y, L(Y, 0)=[3, 4, 5] which gives L (X, i)∩L(Y, i)=[3, 5] leading to $R_0(X, Y)$=2. Equation 2 rearranges the unique pair-wise summations into intersections of these "less than" lists. The inner summation instead of covering all j<i, now covers all j such that X(j)<X(i), and the result is the same since in both cases the unique pairs (i, j) are covered.

Algorithm 1 outlines a transformation method where the permutations in the algorithm are generated randomly and stored for use by all data points. The transformation method depends on coding multiple partial orderings of a data point as a way to lower bound ranking agreement in case of a match. Essentially, K dimensions are selected from the sample, and the dimension with the highest value in the subset of size K is coded. For example, K can be selected at random and consistent across all samples which gives rise to the notion of permutations.

Equality in the codes $c_i$ implies that the estimate of Equation 1 can or possibly should be increased by K−1. If two vectors X and Y have the same value for output code $c_0$, for example, $c_0$=a, for a window size of K, then X and Y match in K−1 inequalities that state X'(a)>X'(i) and Y'(a)>Y'(i) for all i: 0≤i<K, i≠a. So T((x'$_a$−x'$_i$)(y'$_a$−y'$_i$))=1 for all i: 0≤i<K, i≠a which results in a progressively lower bound on a pair-wise order agreement (e.g., Equation 1) between X and Y as more codes match. This is colloquially referred to as a winner takes all (WTA) hash function, because only the "winner" is being encoding in each subset according to a predetermined criterion (e.g., maximum value). It is to be appreciated that although Algorithm 1 is described with reference to the "winner" being a maximum value, such implementation is not limited. For instance, the "winner" can be an additional or alternative encoding of multiple points based on a partial ordering.

The example WTA hashing 300 includes four six dimensional vectors (306A-306D), where K=4, θ=(1, 4, 2, 5, 0, 3). The first vector 306a and the second vector 306b are unrelated and result in different output codes (e.g., 1 and 2, respectively). The vector 306c is a scaled and offset version of the first vector 306a (in this case, times 2, then plus 2), and results in the same output code as 306a (e.g., 1). The fourth vector 306d is a version of the first vector 306a, wherein each element has been perturbed by 1 (in this case, +1, −1, +1, +1, +1, −1). The elements of the fourth vector 306d are ranked differently from the first vector, but the index of the maximum element of the first K (e.g., 4) elements in the fourth vector 306d (e.g., 1) is the same as the index of the maximum element of the first K (e.g., 4) elements in the first vector 306a (e.g., 1).

The vectors 306a and 306c satisfy three inequalities, namely X'(1)>X'(0), X'(1)>X'(2), and X'(1)>X'(3). When computing pair-wise order agreement between the vectors 306a and 306c (e.g., Equation 1), these three terms (e.g., inequalities) will add positive contribution. This implies that equality in code $c_i$ adds K−1 to an estimate of PO in Equation 1, effectively acting as a lower bound. If a large number of codes are generated, then the bound becomes tighter as more possible pair combinations are considered.

Furthermore, it can be appreciated that the choice of K leads to different emphasis on pair-wise agreements for indices at the head of the list. For example, consider the degenerate case in which K=n, where n is the dimensionality of the feature vector. Every permutation encodes the global max element, so n−1 inequalities that relate the max element to all the others would be captured. (In general each permutation encodes K−1 inequalities relating to the max within the first K elements of that permutation.) Therefore, K=n puts complete emphasis on the head of the list. In comparison, K=2 does not put bias on the head as all pairs are encoded. Values of K between 2 and n lead to a progressively steeper bias to the head elements.

Figure 4:
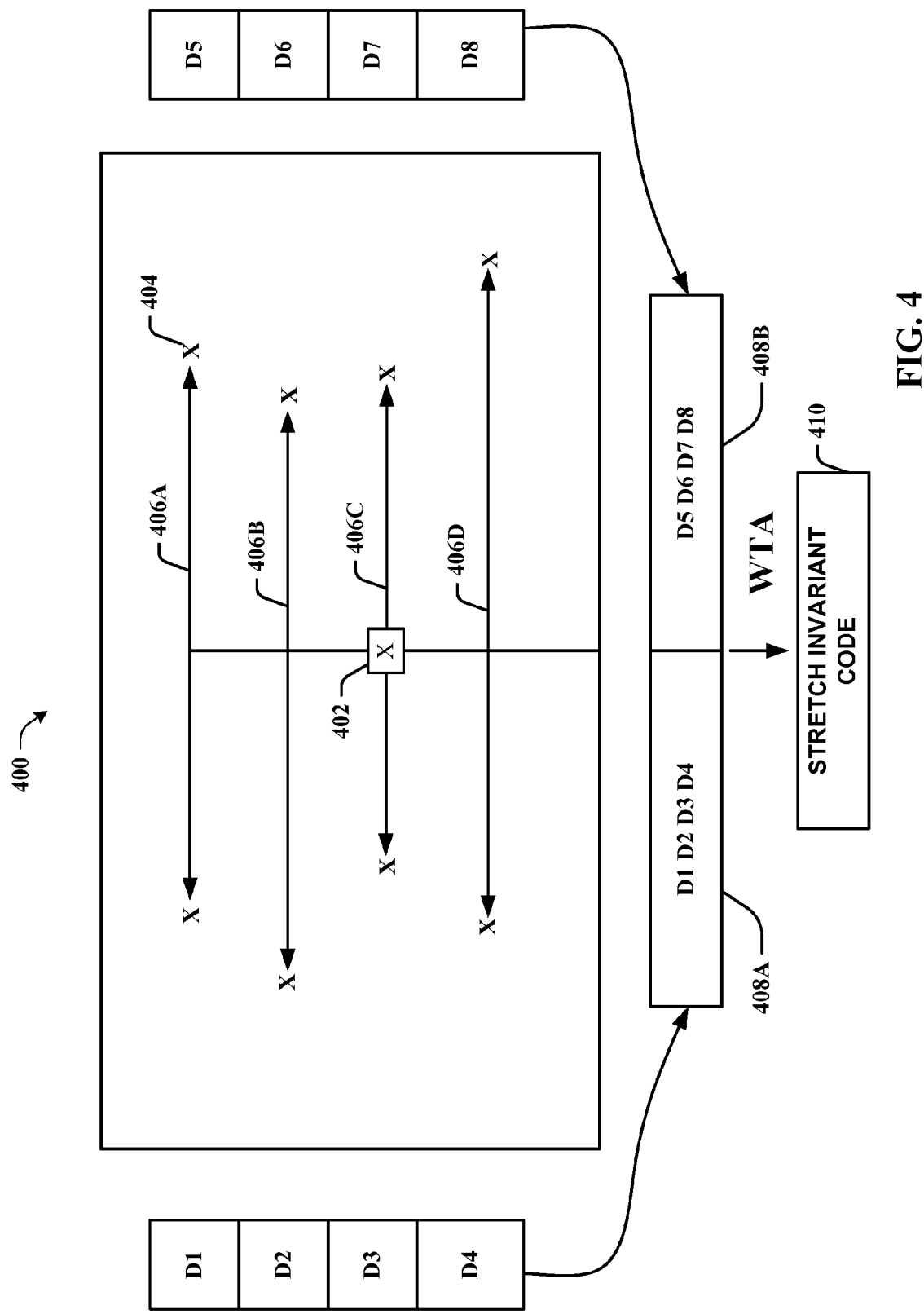
FIG. 4 illustrates an example spectral view of a one-dimensional signal in accordance with various aspects described in this disclosure.

FIG. 4 is an example spectral view 400 illustrating a one-dimensional signal (e.g., a signal image). The signal can be virtually any one-dimensional signal. For example, the signal can be an audio signal (e.g., media content 104). A reference point 402 (e.g., signal marker) can be selected based on a set of reference point selection criterion (e.g., using the reference component 202). For example, the reference point selection criterion can include selecting reference points that meet or exceed a peak threshold. A set of rays 406 can be projected from the reference point 402 at various levels (e.g., rays 406A-406D).

The distance traveled by the respective rays 406 to intersect other reference points 404 (e.g., peaks, etc.) can be determined, measured, or otherwise computed (e.g., D1-D8) (e.g., using the detection component 204). The respective distances can be collected, concatenated, or otherwise combined into a set of vectors 408 (e.g., vectors 408A and 408B). The set of vectors 408 can be encoded based on their relative ordering by employing a winner takes all (WTA) hash function (e.g., using the hashing component 208).

As discussed, the WTA hash function transforms the vectors 408 into binary codes such that a Hamming distance in the resulting space correlates with rank similarity measures. The rank similarity measures provide stability to perturbations in numeric values, and provide good indications of inherent similarity, or agreement, between items or vectors being considered. The result is a transformation invariant code 410 that can be used as a fingerprint for matching the signal to other known signals even when the signal is a perturbed (e.g., time stretched, etc.) version of the other known signal. For example, if the signal is a time stretched version of a known song, the transformation invariant code 410 can be used to identify the signal by looking up known songs in a hash table (e.g., hash table 210). It is to be appreciated that although four rays are illustrated as being projected from the reference point 402, such implementation is not limited. For instance, virtually any number of rays 406 can be projected from the reference point, and virtually any number of reference points can be employed.

Figure 5:
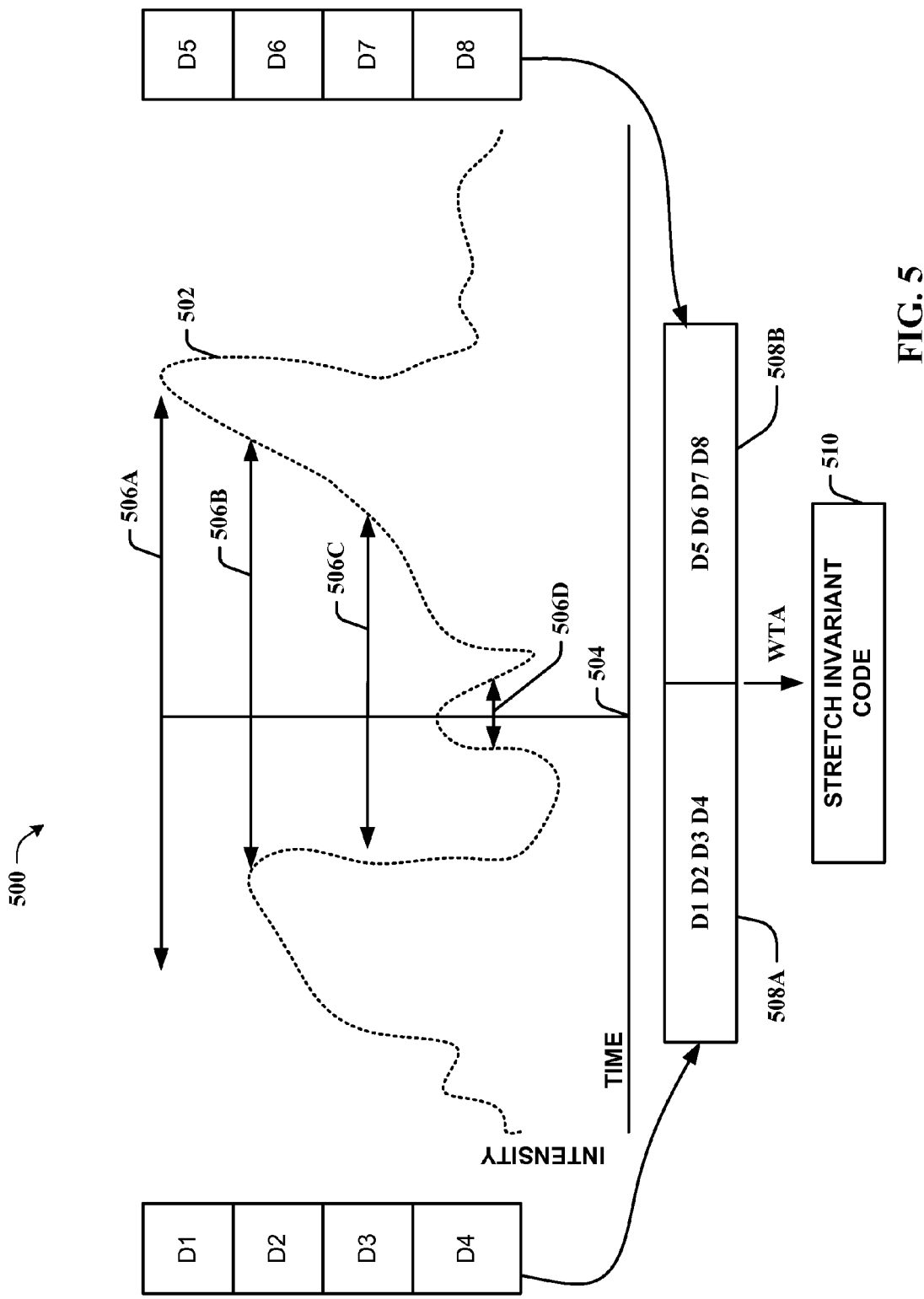
FIG. 5 illustrates an example plot of a one-dimensional signal in accordance with various aspects described in this disclosure.

FIG. 5 is an example plot 500 illustrating a one-dimensional signal 502 (e.g., a signal image, signal, etc.). A reference point 504 can be selected based on a set of reference point selection criterion (e.g., using the reference component 202). For example, the reference point selection criterion can include selecting a predetermined time position. A set of rays 506 can be projected from the reference point 504 at various levels of intensity (e.g., rays 506A-506D), and a determination can be made when the rays 506 intersect the signal 502. The distance traveled by the respective rays 506 to intersect the signal 502 can be determined, measured, or otherwise computed (e.g., D1-D8) (e.g., using the detection component 204). The respective distances can be collected, concatenated, or otherwise aggregated into a set of vectors 508 (e.g., vectors 508A and 508B), and the set of vectors 508 can be adaptively encoded based on their relative ordering by employing a winner takes all (WTA) hash function (e.g., using the hashing component 208). The result is a transformation invariant code 510 that can be used as a fingerprint for matching the signal 502 to other known signals (e.g., media content). The WTA codes can be employed in a lookup system of virtually any size (e.g., using the identification component 108), and enable efficient identification of the known media corresponding to the signal 502.

Figure 6:
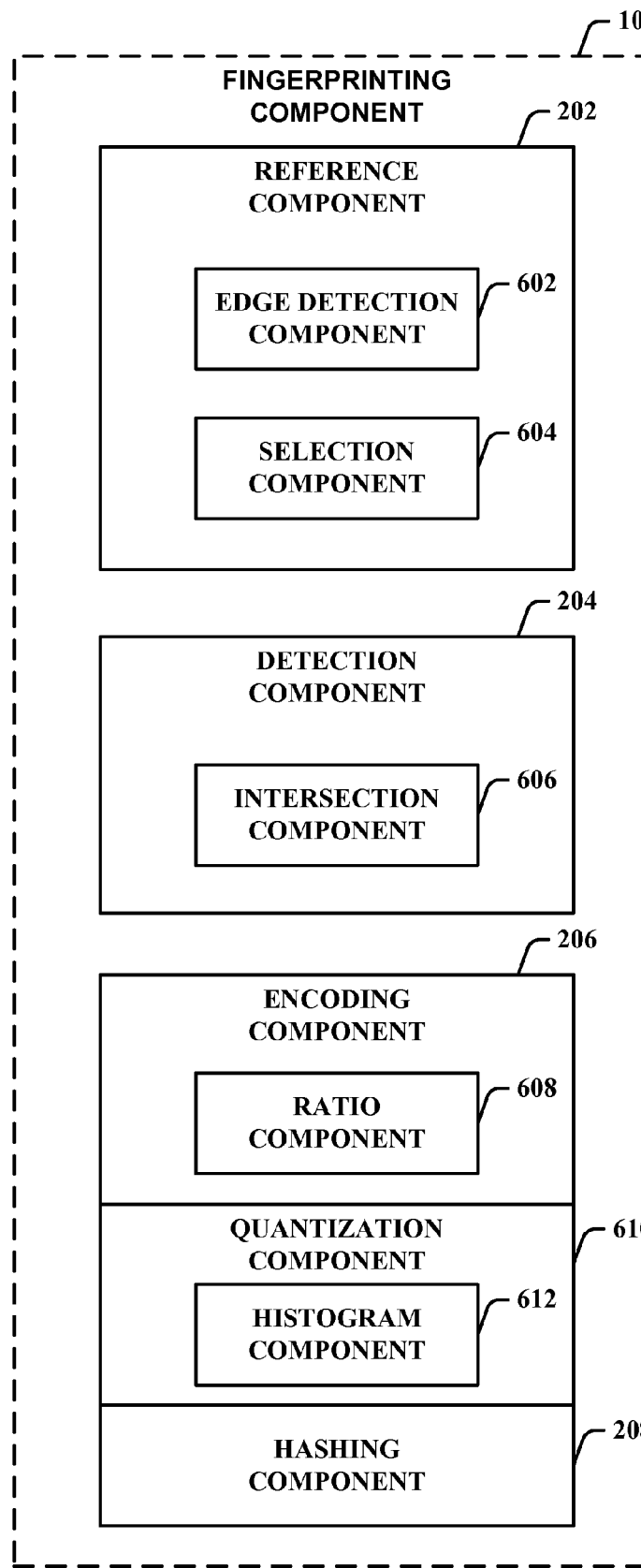
FIG. 6 illustrates is an example fingerprinting component in accordance with various aspects described in this disclosure.

Turning now to FIG. 6, illustrated is an example fingerprinting component 106. The fingerprinting component 106 generates a transformation invariant identifier (e.g., fingerprint) as a function of signal markers included in media content 104. For example, the media content 104 can include an image (e.g., photograph, picture, video frame, etc.), and the fingerprinting component 106 can generate a fingerprint for the image that is unaffected by ratio or aspect modifications. The fingerprinting component 106 in FIG. 6 includes a reference component 202, a detection component 204, and an encoding component 206. The reference component 202 determines a set of reference points (e.g., signal markers, etc.) in the image, the detection component 204 determines respective distances from the reference points to other points (e.g., reference points, edges, signal markers, etc.) in the image, and the encoding component 206 generates the transformation invariant identifier as a function of the distances.

The reference component 202 in FIG. 6 includes an edge detection component 602 and a selection component 604. The edge detection component 602 locates, identifies, or otherwise detects edges in a first direction (e.g., reference points) in the image. The edge detection component 602 can detect edges in the first direction (e.g., horizontal) in the image using virtually any suitable technique, including, but not limited to, convolution with the derivative of a Gaussian filter (e.g., in the Y direction for horizontal edges or in the X direction for vertical edges). The selection component 604 selects a set of the edges in the first direction based on a set of edge selection criterion. The set of edge selection criterion can include, but is not limited to, meeting or exceeding an edge selection threshold, selecting a first K edges in the image, selecting a first K edges in a region of the image, selecting the first K edges for a set of lines in the second direction (e.g., vertical) in the image, where K is an integer, or selecting the edges based on non-maximum suppression. For instance, in one embodiment, the selection component 604 can determine a set of respective filter responses for edges (e.g., via convolution with the derivative of Gaussian filter in the Y direction, for horizontal edges), and edges having a response that is less than the response of one or more edges within a predetermined neighborhood of the edges can be discarded. For example, if the filter response for a first edge is five (5), the filter response for a second edge, that is located below the first edge in the image, is three (3), and the filter response for a third edge, that is located above the first edge in the image, is seven (7), then the first edge will be discarded, because the response of the third edge is larger than the response of the first edge (e.g., non-maximum suppression).

The detection component 204 in FIG. 6 includes an intersection component 606 that computes, identifies, or otherwise determines a set of respective locations where the set of edges in the first direction intersect a set of lines in the second direction. In one non-limiting embodiment, the intersection component 606 can transmit, send, or otherwise project a vector or ray from an edge, and determine the location at which the ray intersects a line in the second direction in the image.

The encoding component 206 in FIG. 6 includes a ratio component 608 and a quantization component 610. The ratio component 608 calculates, computes, or otherwise determines a set of ratios of the distances between subsets of the edges in the first direction based on the set of respective locations where the set of edges in the first direction intersect the set of lines in the second direction (e.g., first direction ratios). For example, the ratio component 608 can determine a ratio AB/BC of the distances for each consecutive set of three edges A, B and C (discussed in greater detail with reference to FIG. 7).

The quantization component 610 quantizes the first direction ratios, and aggregates the quantized first direction ratios over the entire image. The quantization component 610 in FIG. 6 includes a histogram component 612 that constructs a histogram based on the quantized first direction ratios (e.g., first direction histogram). The histogram component 612 can employ various techniques to construct the first direction histogram including, but not limited to, constructing a histogram of the quantized first direction ratios over the entire image, associating the quantized first direction ratios with a quantized X position of the image or a quantized Y position of the image to preserve information or data regarding a location in the imate where the ratio occurred, or employing a sliding window (e.g., in the X direction for vertical distances between horizontal edges or in the Y direction for horizontal distances between vertical edges), and computing a histogram for the sliding window. In addition, the histogram component 612 can augment the histogram values (e.g., bins) with a polarity (e.g., negative or positive) of the set of edges included in the ratio comprising the value. Typically, applying a transformation to the image, such as linearly stretching the image, will not alter the ratio of the distances between the subsets of edges in the first direction (e.g., A, B and C). Quantizing the first direction ratios, and constructing the histogram based on the first direction ratios, adaptively encodes the relative ordering of signal markers (e.g., reference points, edges, etc.) included in the image, and generates a transformation invariant identifier (e.g., the first direction histogram).

The media matching component 102 can match or identify the image based on a comparison with a set of histograms corresponding to known images. For example, the media matching component 102 can determine that the image corresponds to a known image where the histogram for the image is similar, or identical, to a histogram for the known image. Additionally or alternatively, the encoding component 206, e.g., in FIG. 6, can include a hashing component 208 that determines, calculates or otherwise computes a hash value based on the histogram. The hashing component 208 can employ virtually any hashing algorithm that can be employed with histograms, including, but not limited to, hashing based on random projections, weighted min-wise independent permutations locality sensitive hashing (MinHash), winner takes all (WTA) hashing, and so forth. For example, applying WTA hashing to the histogram can provide for increased robustness to errors or missed detection on edges and other reference points.

Additionally or alternatively, the edge detection component 602 can detect edges in the second direction (e.g., vertical) in the image, and the selection component 604 can select a set of the edges in the second direction based on the set of edge selection criterion. The intersection component 606 can determine a set of respective locations where the set of edges in the second direction intersect a set of lines in the first direction (e.g., horizontal) in the image, and the ratio component 608 can determine a set of ratios of the distances between subsets of the edges in the second direction based on the set of respective locations where the set of edges in the second direction intersect the set of lines in the first direction (e.g., second direction ratios). The quantization component 610 can quantize the second direction ratios, and the histogram component 612 can construct a histogram based on the quantized ratios in the second direction (e.g., second direction histogram). In addition, in one implementation, the histogram component 612 can concatenate, join, or otherwise combine the first direction histogram and the second direction histogram into a bidirectional histogram for transformation invariant media matching. In such an embodiment, the hashing component 208 can generate a hash value based on the bidirectional histogram, and the generated hash value can be employed in a lookup system for media matching.

Figure 7A:
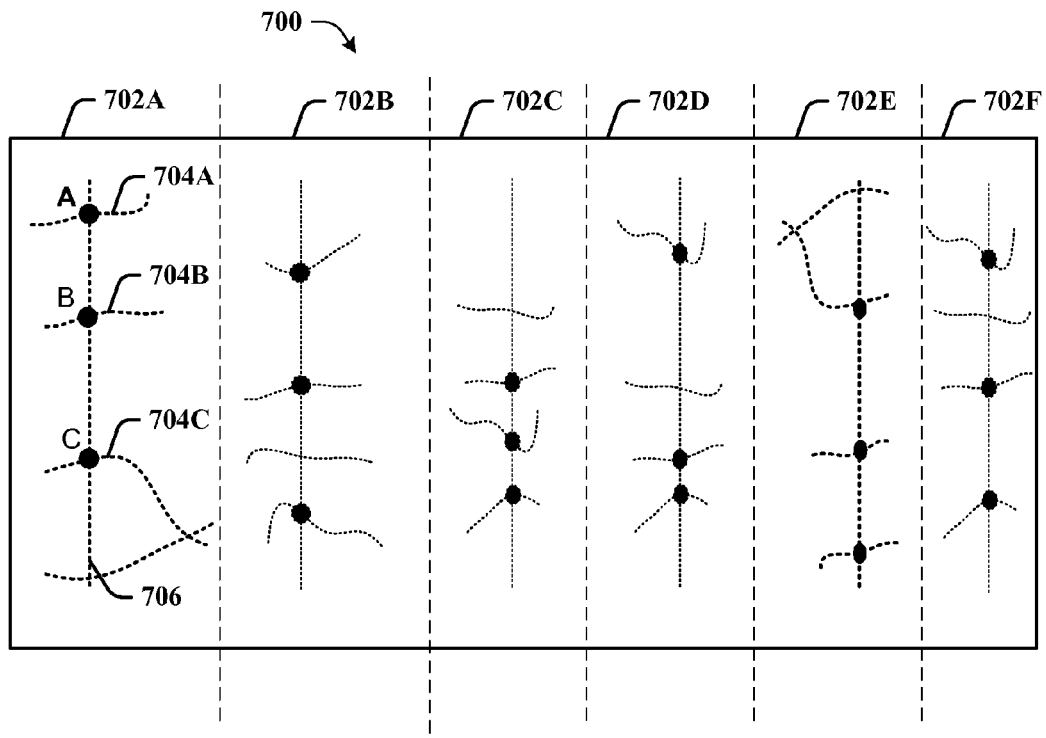
FIG. 7A illustrates an example of edge based descriptor detection in accordance with various aspects described in this disclosure.

FIG. 7A illustrates an example image 700 and detection of edge based descriptors in accordance with various aspects described herein. For brevity and simplicity of explanation the image 700 is separated into six sections 702A-702F; however, it is to be appreciated that the image 700 can be separated into virtually any quantity of sections. In the first section of the image 702A, a set of three horizontal edges 704A-704C (e.g., edges in the first direction) have been detected (e.g., using the edge detection component 602). The horizontal edges 704A-704C can be selected based on their response to a filter, such as exceeding a predetermined threshold. The locations A, B, and C at which the horizontal edges 704A-704C intersect a vertical line 706 (e.g., line in the second direction) is determined (e.g., using the intersection component 606), and a ratio AB/BC of the distances for the locations at which the three edges A, B and C intersect the line 706 is determined (e.g., using the ratio component 608).

Figure 7B:
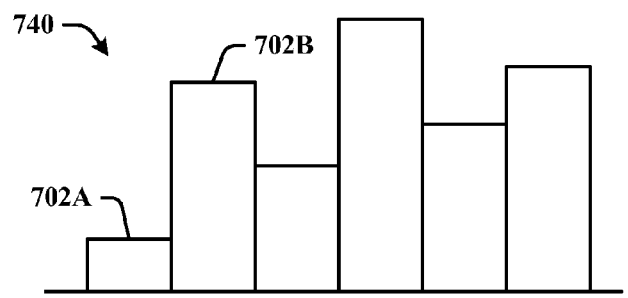
FIG. 7B illustrates an example histogram in accordance with various aspects described in this disclosure.

Similarly, ratios of the respective distances of locations at which a set of horizontal edges intersect vertical lines can be determined for the image sections 702B-702F. The ratios (e.g., AB/BC) can be quantized (e.g., using the quantization component 610), and a histogram 740, as illustrated in FIG. 7B, can be generated based on the quantized ratios. In addition, the quantized horizontal ratios can be associated with a quantized X position of the image 700 or a quantized Y position of the image 700 to preserve information or data regarding a location in the image 700 where the ratio occurred. For example, the quantized ratio AB/BC for the first section of the image 702A can be associated with position information to indicate in the histogram 740 that the ratio occurred in the first section 702A of the image 700.

A hash value can be determined based on the histogram 740 (e.g., using the hashing component 208). The hash value can be determined using virtually any hashing algorithm that can be employed with histograms, including, but not limited to, hashing based on random projections, weighted min-wise independent permutations locality sensitive hashing (min-hash), winner takes all (WTA) hashing, and so forth. For example, applying WTA hashing to the histogram can provide for increased robustness to errors or missed detection on edges and other reference points. As discussed, the hash value can be employed as a fingerprint to lookup images having similar, or identical, hash value to the image 700 in a hash table (e.g., hash table 210).

Non-Limiting Examples of Methods for Transformation Invariant Media Matching

Figure 8:
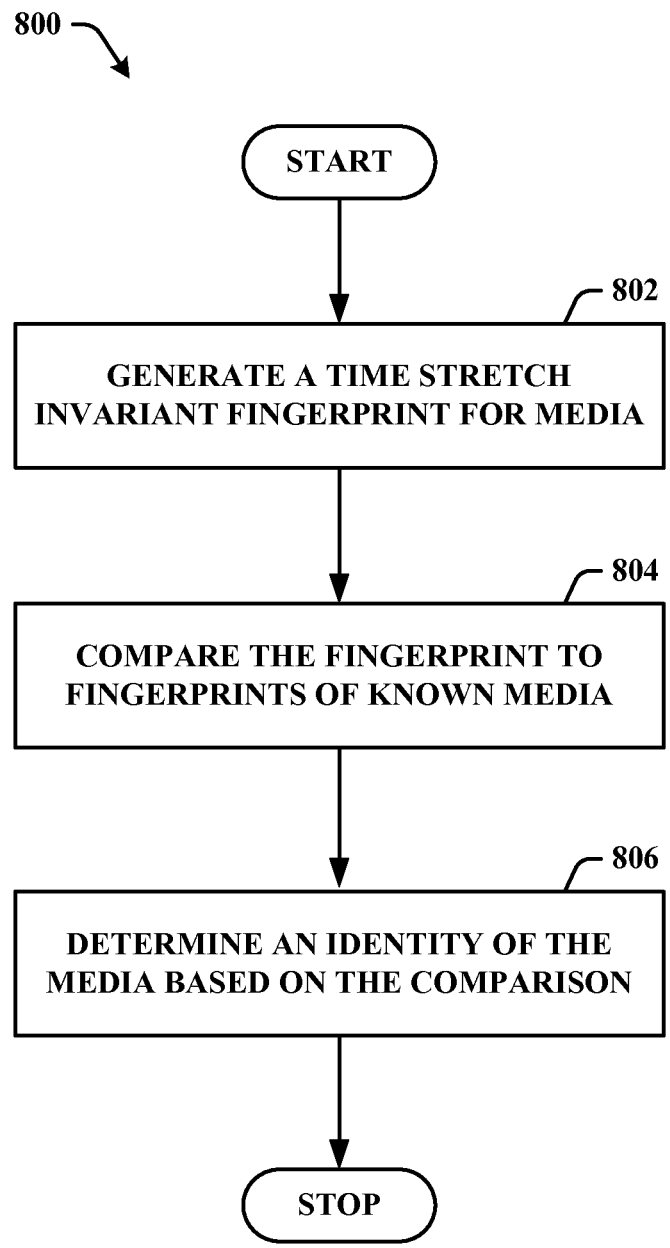
FIGS. 8-10 are example flow diagrams of respective transformation invariant media matching in accordance with various aspects described herein.
Figure 9:
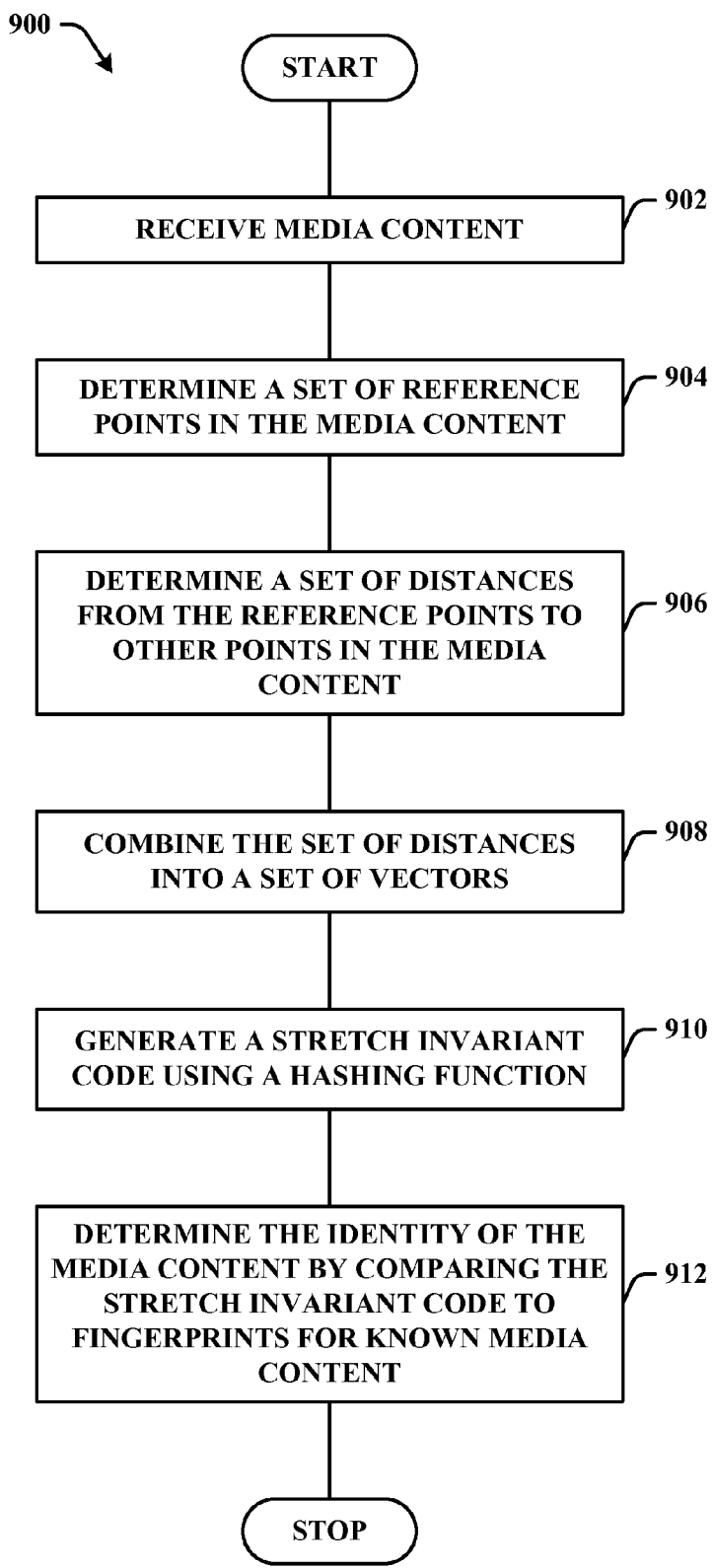
Figure 10:
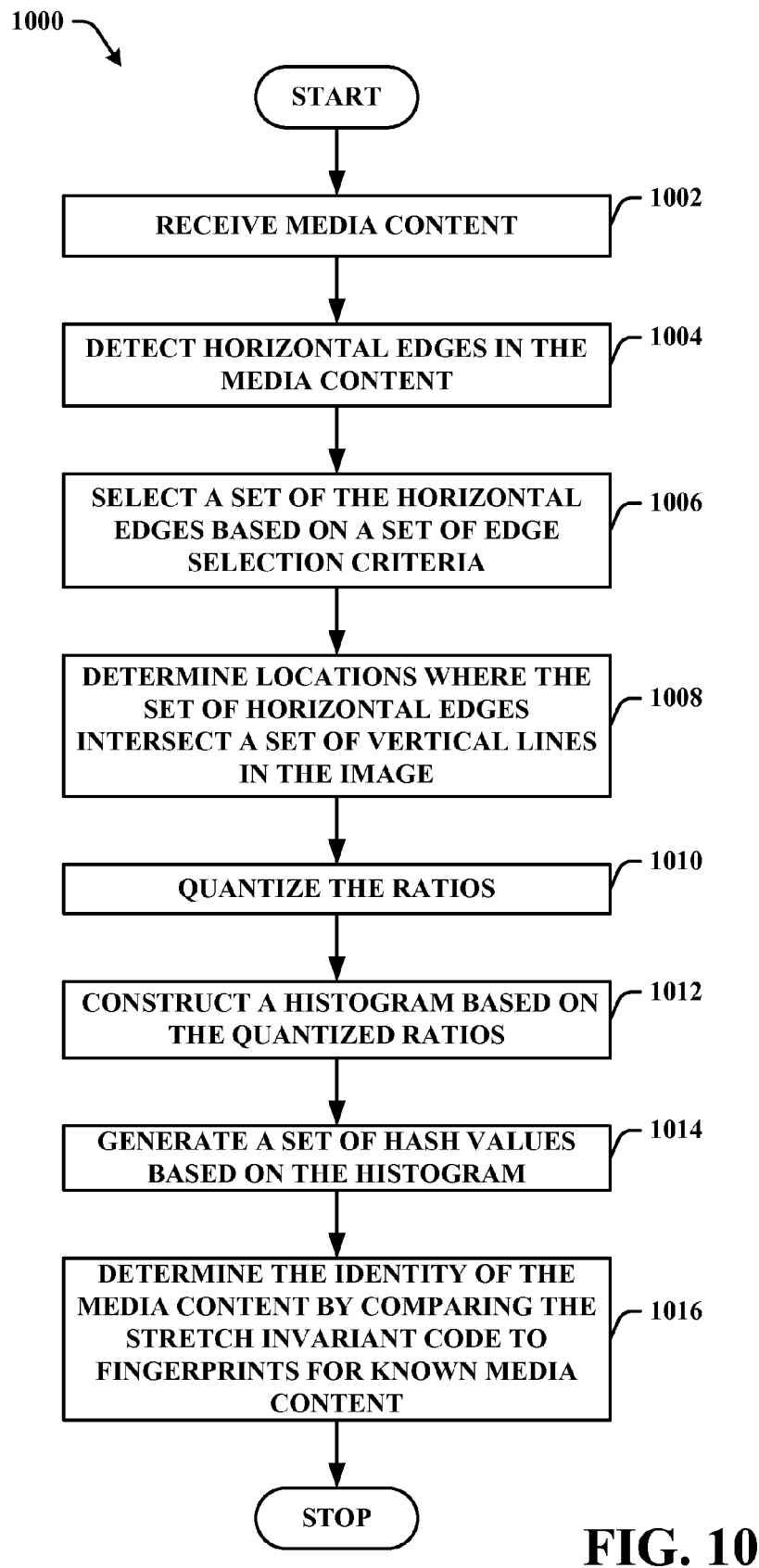

FIGS. 8-10 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 8, illustrated is an example methodology 800 for transformation invariant media matching. At reference numeral 802, a transformation invariant fingerprint is generated for media content (e.g., using the fingerprinting component 106). The media content can include a signal, an image, a song, a video, and so forth, and the transformation invariant fingerprint is an identifier generated using signal markers (e.g., peaks, edges, predetermined locations in the image, reference points, etc.) in the media that are unaffected, or marginally affected, by modification or alteration of the media (e.g., time stretch, aspect changes, ratio changes, etc.). At reference numeral 804, the transformation invariant fingerprint for the media is compared to a set of fingerprints for known media content (e.g., using the identification component 108). For example, if the media content is a song, then the fingerprint generated for the song can be compared to a set of fingerprints for known songs. At reference numeral 806, the media content can be identified based on the comparison with the set of fingerprints. For example, the media content can be identified as corresponding to, or being a version of, a known song in a set of songs, when the transformation invariant fingerprint for the media content meets or exceeds a matching threshold with a fingerprint for the known song.

Turning to FIG. 9, illustrated is an example methodology 900 for transformation invariant media matching using reference point geometry in accordance with various aspects described herein. At reference numeral 902, media content is received, obtained, or otherwise acquired (e.g., using the media matching component 102). For example, the media content can be received from a user upload to a media hosting service. At reference numeral 904, a set of reference points (e.g., signal markers) in the media content is selected (e.g., using the reference component 202). The media content can be translated or represented as a signal image, and the set of reference points can be selected in the signal image. For example, if the media content includes audio data (e.g., a song, etc.), then the media content can be represented as a one-dimensional plot of the audio data. The reference points can be determined based on satisfying of a set of reference point selection criterion, including but not limited to, satisfying a predetermined filter response threshold, meeting or exceed a peak threshold, corresponding to a predetermined location in the media content, and so forth.

At reference numeral 906, a set of respective distances from the reference points to other locations (e.g., other reference points, peaks, etc.) in the signal image at various levels are determined, measured, or otherwise computed (e.g., using the detection component 204). The respective distances can be determined by transmitting rays from the reference points at various levels, and determining the distance to the closest location in the media content that intersect (e.g., hits, collides with, etc.) the rays.

At reference numeral 908, the set of respective distances are combined into a set of vectors (e.g., using the encoding component 206). At reference numeral 910, a transformation invariant code is generated by calculating a hash value based on the set of vectors (e.g., using the hashing component 208). For example, the hash value can be calculated using a winner takes all (WTA) hash function. As discussed, the WTA hashing function can transform the vectors into binary codes such that a Hamming distance in the resulting space correlates with rank similarity measures. The rank similarity measures provide stability to perturbations in numeric values, and provide good indications of inherent similarity, or agreement, between items or vectors being considered. The result is a transformation invariant code that provides a fingerprint for matching the signal to other known signals even when the signal is a perturbed (e.g. time stretched, etc.) version of the other known signal.

At reference numeral 912, the identity of the media content is determined by comparing the transformation invariant code, acting as a fingerprint, to fingerprints for known media content (e.g., using the identification component 108). For example, the hash value calculated in 910, which is a transformation invariant code, can act as a fingerprint of the media content, and be compared against a hash table of known media content (e.g., hash table 210). If the hash value for the media content corresponds to a known song in the hash table, then the media content is identified as corresponding to, or being a version of, the known song.

FIG. 10 illustrates an example methodology 1000 for transformation invariant media matching via a ratio histogram in accordance with various aspects described herein. At reference numeral 1002, media content is received, obtained, or otherwise acquired (e.g., using the media matching component 102). For example, the media content can be received from a user upload to a media hosting service. At reference numeral 1004, edges in a first direction are detected in the media content (e.g., using the edge detection component 602). The edges in the first direction can be detected using virtually any suitable technique, including, but not limited to, convolution with the derivative of a Gaussian filter (e.g., in the Y direction for horizontal edges or in the X direction for vertical edges).

At reference numeral 1006, a set of the edges in the first direction is selected based on a set of edge selection criterion. The set of edge selection criterion can include, but is not limited to, meeting or exceeding an edge selection threshold, selecting a first K edges in the image, selecting the first K images in a region of the image, selecting the first K edges for a set of lines in the second direction, where K is an integer, or selecting the edges based on non-maximum suppression. At reference numeral 1008, a set of respective locations where the set of edges in the first direction intersect a set of lines in a second direction is determined (e.g., using the intersection component 606). For example, the location where a set of horizontal edges (e.g., edges in the first direction) intersect every vertical line (e.g., edges in the second direction) in the image can be determined. As another example, the image may be divided into vertical sections and a vertical line within each slice identified. In such an implementation, the intersection component 606 may determine the location where the set of horizontal edges intersect each of the verticals lines in that set of vertical lines.

At reference numeral 1010, a set of ratios of the distance between subsets the edges in the first direction are determined based on the set of respective locations where the edges in the first direction intersect the set of lines in the second direction (e.g., first direction ratios) (e.g., using the ratio component 608). For example, a ratio AB/BC of the distance for each consecutive set of three edges A, B and C (discussed in greater detail with reference to FIG. 7) can be determined. Typically, applying one or more transformations to the image, such as stretching the image in a linear fashion, will not alter the ratio of the distances between the subsets of edges (e.g., A, B and C). As a result, the ratios can be employed to generate transformation invariant identifiers.

At reference numeral 1012, the first direction ratios are quantized (e.g., using the quantization component 610), and a histogram is constructed based on the quantized first direction ratios (e.g., using the histogram component 612). The histogram can be constructed via various techniques including, but not limited to, constructing a histogram of the quantized first direction ratios over the entire image, associating the quantized first direction ratios with a quantized X position of the image or a quantized Y position of the image to preserve information or data regarding a location in the image where the ratio occurred, or employing a sliding window (e.g., in the X direction for vertical distances between horizontal edges or in the Y direction for horizontal distances between vertical edges), and computing a histogram for the sliding window. In addition, the histogram values can be augmented with a polarity (e.g., negative or positive) of the set of edges included in the ratio comprising the value.

At reference numeral 1014, a hash value is generated based on the histogram. The hash value can be generated using virtually any hashing algorithm that can be employed with histograms, including, but not limited to, hashing based on random projections, weighted min-wise independent permutations locality sensitive hashing (MinHash), winner takes all (WTA) hashing, and so forth. For example, applying WTA hashing to the histogram can provide for increased robustness to errors or missed detection on edges and other reference points. Additionally or alternatively, edges in the second direction in the image can be detected (e.g., using the edge detection component 602), and a set of the edges in the second direction can be selected based on the set of edge selection criterion (e.g., using the selection component 604). A set of respective locations where the set of edges in the second direction intersect a set of lines in the first direction in the image can be determined (e.g., using the intersection component 606), and a set of ratios of the distances between subsets of the edges in the second direction based on the set of respective locations where the set of edges in the second direction intersect the set of lines in the first direction (e.g., second direction ratios) can be determined (e.g., using the ratio component 608). The second direction ratios can be quantized (e.g. using the quantization component 610), and a histogram can be constructed based on the quantized second direction ratios (e.g., second direction histogram) (e.g., using the histogram component 612). The first direction histogram and the second direction histogram can be concatenated, joined, or otherwise combined and the hash value can be determined based on the concatenated histograms.

At reference numeral 1016, the hash value (e.g., fingerprint, transformation invariant code, etc.) is compared against a hash table for known media content (e.g., hash table 210) to determine an identity of the media content (e.g., using the identification component 108). For example, if the hash value corresponds to a known image in the hash table, then the media content is identified as corresponding to, or being a version of, the known image. Additionally or alternatively, the first histogram, second histogram, or bidirectional histogram can be used as a transformation invariant identifier, and compared against set of histograms corresponding to known media content to identify the media content.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of this disclosure.

Figure 11:
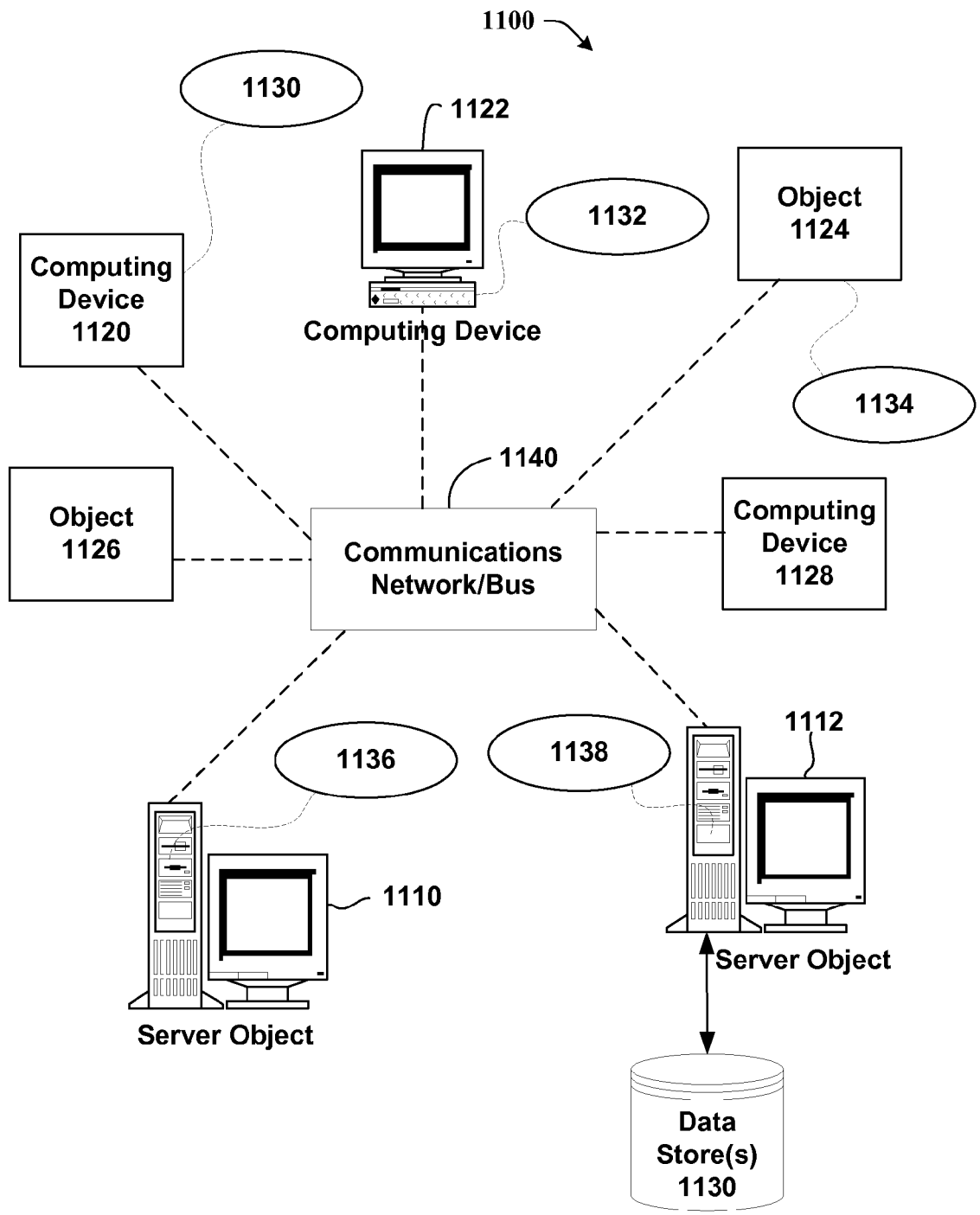
FIG. 11 is a block diagram representing an exemplary non-limiting networked environment in which the various embodiments can be implemented.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1111, 1112, etc. and computing objects or devices 1120, 1122, 1124, 1126, 1128, etc. may comprise different devices, such as personal data assistants (PDAs), audio/video devices, mobile phones, MP3 players, personal computers, tablets, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the smooth streaming provided in accordance with various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1111, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1140 is the Internet, for example, the computing objects 1110, 1112, etc. can be Web servers with which the client computing objects or devices 1120, 1122, 1124, 1126, 1128, etc. communicate via any of a number of known protocols, such as the hypertext transfer protocol (HTTP). Objects 1110, 1112, etc. may also serve as client computing objects or devices 1120, 1122, 1124, 1126, 1128, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 12:
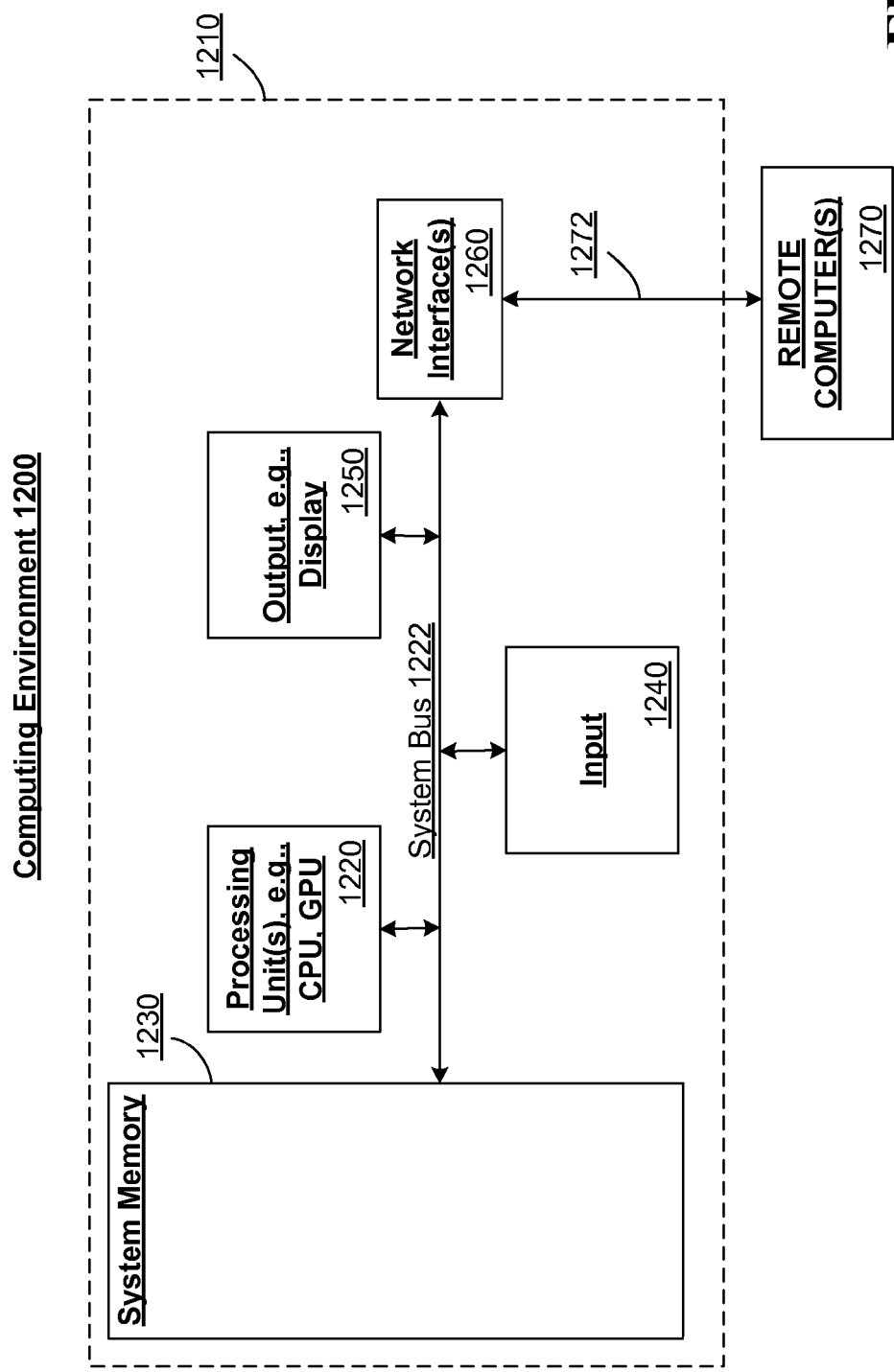
FIG. 12 is a block diagram representing an exemplary non-limiting computing system or operating environment in which the various embodiments may be implemented.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 be interpreted as having any dependency or requirement relating to any one or combination of components illustrated in the exemplary operating environment 1200.

With reference to FIG. 12, an exemplary remote device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
   a memory storing computer executable components; and
   a processor configured to execute the following computer executable components stored in the memory:
   a reference component configured to select a reference point in a signal image;
   a detection component configured to determine a set of respective distances from the reference point to a set of other points at various levels in the signal image; and
   a hashing component configured to generate a hash value using a winner take all hash function on the set of respective distances, wherein the winner take all hash function performs for the set of respective distances:
   generate a set of m permutations $\Theta$, where m is an integer;
   for each permutation $\Theta_i$, where i is an integer from 0 to m−1:
   permutate distances of the set of respective distances according to $\Theta_i$ to generate a permutated set of distances,
   initialize sparse code $c_{xi}$ to 0, and
   set $c_{xi}$ to a distance of maximum value in the permutated set of distances; and
   set hash value equal to $(c_{x0}, c_{x1}, \ldots, c_{xm-1})$.

2. The system of claim 1, further comprising an identification component configured to compare the hash value against a hash table of known media content and, based on the comparison, identify the signal image.

3. The system of claim 1, wherein the hash value is a transformation invariant code that compensates for perturbations in the signal image.

4. The system of claim 1, wherein the signal image is a graphical representation of media content.

5. The system of claim 4, wherein the media content includes audio data.

6. The system of claim 4, wherein the media content includes image data.

7. A method, comprising:
  selecting, by a system including a processor, a reference point in a signal image;
  determining, by the system, a set of respective distances from the reference point to a set of additional points at various levels in the signal image; and
  generating, by the system, a hash value using a winner take all hash function on the set of respective distances, wherein the winner take all hash function performs for the set of respective distances:
    generate a set of m permutations $\Theta$, where m is an integer;
    for each permutation $\Theta_i$, where i is an integer from 0 to m−1:
      permutate distances of the set of respective distances according to $\Theta_i$ to generate a permutated set of distances,
      initialize sparse code $c_{xi}$ to 0, and
      set $c_{xi}$ to a distance of maximum value in the permutated set of distances; and
    set hash value equal to $(c_{x0}, c_{x1}, \ldots, c_{xm-1})$.

8. The method of claim 7, further comprising comparing, by the system, the hash value against a hash table of known media content, and identifying the signal image based on the comparison.

9. The method of claim 7, further comprising selecting, by the system, the reference point based on a set of reference point selection criterion.

10. The method of claim 7, wherein the determining the set of respective distances from the reference point to the set of additional points at various levels in the signal image, includes projecting at least one ray from the reference point at the respective levels, and determining a length of the at least one ray.

11. The method of claim 10, wherein the projecting at least one ray from the reference point includes dissecting the signal image.

12. The method of claim 7, wherein the hash value is a transformation invariant code that compensates for perturbations in the signal image.

13. The method of claim 7, wherein the signal image is a graphical representation of media content.

14. The method of claim 13, wherein the media content includes at least one of audio data or image data.

15. A non-transitory computer-readable medium having instructions stored thereon that, in response to execution, cause a system including a processor to perform operations comprising:
  selecting a reference point in a signal image;
  determining a set of respective distances from the reference point to a set of additional points at various levels in the signal image; and
  generating a hash value using a winner take all hash function on the set of respective distances, wherein the winner take all hash function performs for the set of respective distances:
    generate a set of m permutations $\Theta$, where m is an integer;
    for each permutation $\Theta_i$, where i is an integer from 0 to m−1:
      permutate distances of the set of respective distances according to $\Theta_i$ to generate a permutated set of distances,
      initialize sparse code $c_{xi}$ to 0, and
      set $c_{xi}$ to a distance of maximum value in the permutated set of distances; and
    set hash value equal to $(c_{x0}, c_{x1}, \ldots, c_{xm-1})$.

16. The non-transitory computer-readable medium of claim 15, the operations further comprising comparing the hash value against a hash table of known media content, and identifying the signal image based on the comparison.

17. The non-transitory computer-readable medium of claim 15, the operations further comprising selecting the reference point based on a set of reference point selection criterion.

18. The non-transitory computer-readable medium of claim 15, wherein the determining the set of respective distances from the reference point to the set of additional points at various levels in the signal image, includes projecting at least one ray from the reference point at the respective levels, and determining a length of the at least one ray.

19. The non-transitory computer-readable medium of claim 15, wherein the projecting at least one ray from the reference point includes dissecting the signal image.

20. The non-transitory computer-readable medium of claim 15, wherein the hash value is a transformation invariant code that compensates for perturbations in the signal image.

* * * * *